United States Patent [19]

Fischer et al.

[11] 4,180,635

[45] Dec. 25, 1979

[54] CONTINUOUS MANUFACTURE OF UNSATURATED POLYESTERS

[75] Inventors: Hermann Fischer, Limburgerhof; Richard Thoma, Battenberg; Hanshelmut Kaeppel, Weinheim; Ernst Kochendoerfer, Ludwigshafen; Werner Lagaly, Frankenthal, all of Fed. Rep. of Germany

[73] Assignee: BASF Aktiengesellschaft, Fed. Rep. of Germany

[21] Appl. No.: 891,204

[22] Filed: Mar. 29, 1978

[30] Foreign Application Priority Data

Apr. 2, 1977 [DE] Fed. Rep. of Germany ....... 2714898

[51] Int. Cl.² .................. C08G 63/52; C08G 63/22
[52] U.S. Cl. .................................. 526/68; 528/303; 528/304; 528/306
[58] Field of Search ............... 526/68; 528/303, 304, 528/306

[56] References Cited

U.S. PATENT DOCUMENTS

| | | | |
|---|---|---|---|
| 2,892,813 | 6/1959 | Georgian et al. | 528/306 X |
| 3,390,135 | 6/1968 | Seiner | 528/303 X |
| 3,911,048 | 10/1975 | Vargiu et al. | 528/303 X |
| 4,064,111 | 12/1977 | Masuda et al. | 526/68 X |

FOREIGN PATENT DOCUMENTS 1097984  1/1966  United Kingdom .

*Primary Examiner*—Walter C. Danison
*Attorney, Agent, or Firm*—Keil & Witherspoon

[57] ABSTRACT

An economical and environmentally advantageous process for the continuous manufacture of unsaturated polyesters, wherein the vapors formed during the polycondensation are purified, in a two-part distillation column, to a degree where the residual content of organic starting materials is less than 1.5 percent by weight, based on the total weight of the effluent, and the unconverted starting materials are recycled to the process.

10 Claims, 1 Drawing Figure

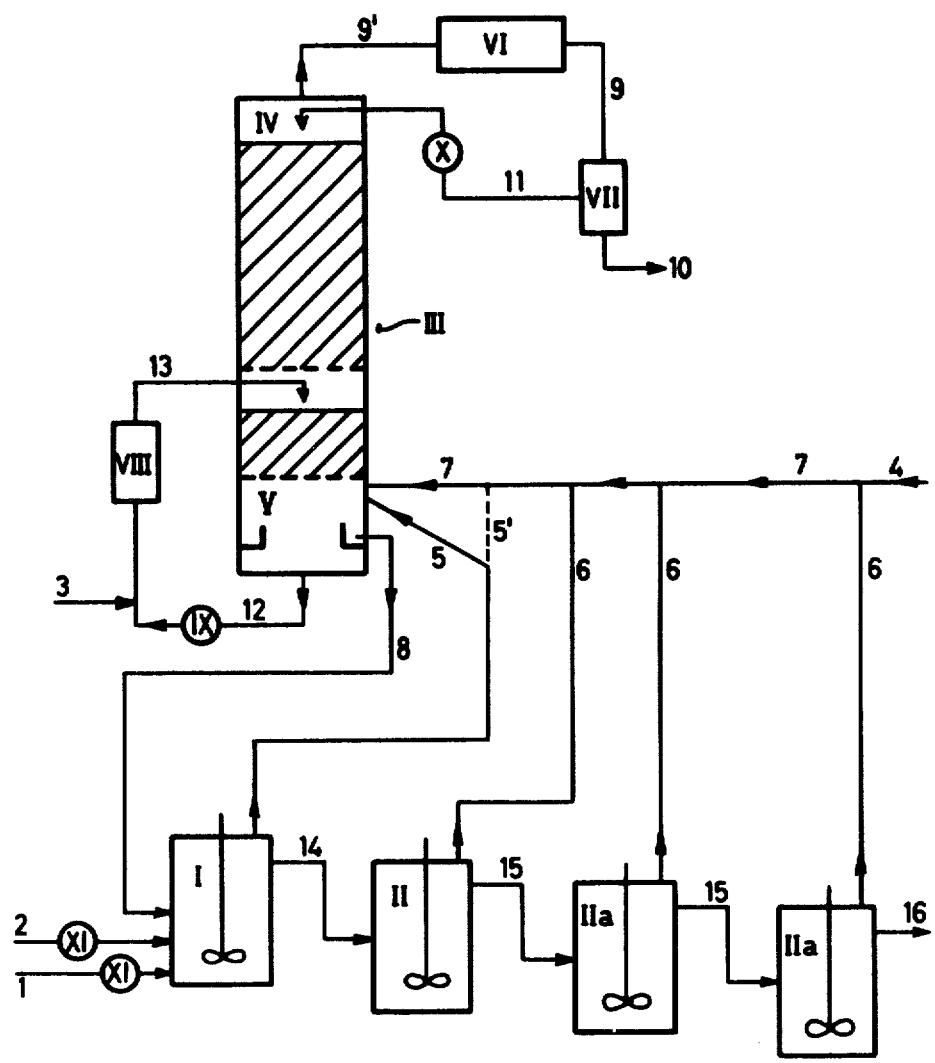

CONTINUOUS MANUFACTURE OF UNSATURATED POLYESTERS

The present invention relates to an economical and environmentally advantageous process for the continuous manufacture of unsaturated polyesters, by means of which process the vapors formed during the polycondensation can be purified, with the aid of a new method, in a two-part distillation column, to a degree where the residual content of organic starting materials is less than 1.5 percent by weight, based on the total weight of the effluent, and the unconverted starting materials obtained are recycled to the manufacturing process.

Unsaturated polyesters are in general manufactured by polycondensation of ethylenically unsaturated dicarboxylic acids and/or their derivatives, in the presence or absence of other saturated and/or unsaturated monocarboxylic acids and/or dicarboxylic acids or their derivatives, with about equivalent amounts of polyalcohols, preferably glycols, by heating at from about 160° to 220° C. and passing inert gases through the melt.

According to the disclosure of U.S. Pat. No. 3,390,135, for example, unsaturated polyesters are manufactured by reacting polyhydric alcohols and unsaturated dicarboxylic acids or their anhydrides at from 200° to 300° C. in a closed apparatus, which prevents the escape of the water of condensation formed, under superatmospheric pressure, to give the half-esters of the reactants, without any substantial polyester formation taking place, and then passing the hot mixture into a flash vaporizer where the water of reaction is vaporized and the complete esterification is effected. A disadvantage of the process described is that in the first stage of the reaction the condensation must be carried out under superatmospheric pressure. This results, under the stated reaction conditions, in irreversible adduct formation of both water and diols at the ethylenically unsaturated double bonds, so that not only is the double bond content, and hence the reactivity, of the resulting unsaturated polyesters diminished, but trifunctional and polyfunctional end products are also formed.

In order to avoid premature gelling of unsaturated polyesters which are manufactured in the presence of dicarboxylic acids which undergo relatively slow esterification, it has also been proposed to carry out the esterification in 2 stages. In this process, only the saturated dicarboxylic acids are esterified initially, so that even with an extremely long esterification time no premature polymerization can occur. Only after the esterification of these acids has progressed sufficiently far is the unsaturated dicarboxylic acid added and the condensation completed, usually at from 100° to 150° C. It is a disadvantage of this 2-stage process that given the normally short esterification time sufficient isomerization of maleic acid to the trans-form does not occur at below 150° C., so that on dissolving the unsaturated polyester in styrene, the unsaturated polyester resins obtained are of low reactivity and give poor mechanical properties.

According to the disclosure of British Pat. No. 1,097,984, unsaturated polyesters for curable polyester molding compositions are manufactured by condensing the components for the synthesis of the polyester continuously in three or four stirred kettles, connected in series, at from 120° to 180° C. in the first kettle and from 195° to 140° C. in the last kettle and at intermediate temperatures in the intermediate kettles, the mean residence time being about the same in each kettle. Though unsaturated polyester resins having good shelf life can be manufactured in yields of about 95% by means of this process, and these resins, on curing, give moldings with good mechanical properties and an improved surface structure, this process also suffers from certain disadvantages. One disadvantage is that to prevent maleic anhydride and phthalic anhydride from subliming, the reaction in the first stirred kettle must be carried out at a relatively low temperature and hence also takes place relatively slowly. If the reaction temperature is raised, blockages can occur as a result due to carboxylic acid anhydrides which sublime and re-deposit in the off-gas pipelines.

However, all the above processes have the disadvantage that the vapors formed during the condensation, which essentially consist of water of condensation, contain a not insignificant proportion—which can be up to 35 percent by weight, based on the total weight—of organic constituents, preferably diols. Vapors containing organic constituents however not only pollute the environment but also add to the process costs, since the starting materials are not converted quantitatively.

It is an object of the present invention to provide a continuous process for the manufacture of ethylenically unsaturated polyesters, which are copolymerizable with ethylenically unsaturated monomers and are therefore suitable for the preparation of unsaturated polyester resins, in which process the polycondensation is carried out with high space-time yields and with virtually quantitative conversion of the starting components. More particularly, it is an object of the invention to purify the vapors to a degree where the residual content of organic starting materials is at most 1.5 percent by weight, based on the total weight of the effluent, and to recycle the unconverted starting materials, thus obtained, to the polycondensation process.

We have found that this object is achieved by a process for the continuous manufacture of unsaturated polyesters by polycondensation of ethylenically unsaturated dicarboxylic acids, with or without dicarboxylic acids free from olefinic unsaturation, and/or their anhydrides, with diols, with or without monohydric and/or polyhydric alcohols, in a stirred kettle cascade, wherein (a) in a first reaction stage, the dicarboxylic acid or acids and/or its anhydride or their anhydrides are condensed with the diols in the molar ratio of from 1:1.0 to 1:1.1, preferably from 1:1 to 1:1.05, at from about 190° to 250° C., with the proviso that the reaction mixture is boiling, the water of condensation is separated, from the vapors which distil off, by means of a vapor column, and the unconverted distilled-off or sublimed starting materials are recycled to the reaction mixture, the vapor column used being a two-part distillation column (i) in the upper part of which, at from about 95° to 135° C., the diol/water of condensation mixture is separated by spraying it in counter-current with water of condensation, the spray density being from 0.5 to 5 m³/m² per hour and (ii) in the lower part of the column, at from 110° to 180° C., unconverted dicarboxylic acids and/or their anhydrides and part of the diol are absorbed, partially esterified and washed out by spraying in counter-current, at a spray density of from 20 to 80 m³/m² per hour, with a mixture of refluxing diol from the upper part of the column, freshly fed-in diol and circulated reaction medium, and are recycled to the reaction mixture, and (b) in a second stage of the reaction, the condensation of the resulting reaction mixture is completed at from 190° to 250° C.

The polycondensation process of the invention has the advantage that in the first stage of the reaction the polycondensation is carried out at the boiling point of the reaction mixture, whereby the space-time yield is substantially increased. The starting components which distil off and sublime are absorbed in the lower part of the two-part distillation column, there partially converted to the carboxylic acid monoesters and diesters of the corresponding dicarboxylic acids or dicarboxylic acid anhydrides and diols, washed out, and dissolved, by spraying with the reaction medium, and recycled to the reaction mixture. This prevents blockage of the vapor lines by dicarboxylic acids or their anhydrides. The spraying, according to the invention, of the vapors with water of condensation in the upper part of the two-part distillation column, or with a mixture of diol and reaction medium in the lower part of the column, makes it possible to lower the residual content of starting materials in the effluent to less than 1.5 percent by weight, preferably from 0.8 to 1.2 percent by weight, based on the total weight of the effluent.

The conventional known starting components for polyesters can be used for the manufacture of the unsaturated polyesters by the process according to the invention.

Preferred dicarboxylic acids free from olefinic unsaturation, and their derivatives, are aromatic and aliphatic dicarboxylic acids and/or their derivatives. Specific examples are o-phthalic acid, tetrachlorophthalic acid, tetrabromophthalic acid, hexachloroendomethylenetetrahydrophthalic acid and the corresponding phthalic anhydrides, isophthalic acid, terephthalic acid, succinic acid, glutaric acid, adipic acid, sebacic acid and dimerized fatty acids. The use of the anhydrides of the substituted or unsubstituted phthalic acids is preferred, but o-phthalic anhydride and isophthalic acid are especially preferred. The dicarboxylic acids free from olefinic unsaturation, and their derivatives, especially their anhydrides, can be polycondensed either individually or as mixtures with one another. In addition to the dicarboxylic acids free from olefinic unsaturation, small amounts of monocarboxylic acids, e.g. acetic acid, butyric acid, α-ethylhexanoic acid, oleic acid and stearic acid, or of polycarboxylic acids, e.g. trimellitic acid or pyromellitic acid, can be employed.

Examples of suitable ethylenically unsaturated dicarboxylic acids and their derivatives are maleic acid, fumaric acid, 1,2,3,6-tetrahydrophthalic acid, 3,6-endomethylene-1,2,3,6-tetrahydrophthalic acid, itaconic acid, citraconic acid, mesaconic acid, maleic anhydride and citraconic anhydride. The use of maleic anhydride is preferred.

Preferred polyhydric alcohols are diols. Specific examples are ethylene glycol, diethylene glycol, 1,2- and 1,3-propylene glycol, 1,3- and 1,4-butanediol, neopentylglycol, dibromoneopentylglycol, 1,6-hexanediol, 2,2-(4,4'-dihydroxydiphenyl)propane, 2,2-(4,4'-dihydroxydicyclohexyl)-propane, bis-ethoxydiphenylolpropane and 1,4-dimethylol-cyclohexane. The use of 1,2- and 1,3-propylene glycol is preferred. The said diols can again be used individually or as mixtures with one another or with monoalcohols and/or with polyalcohols of higher functionality than two. Examples of suitable monoalcohols are n- and iso-butanol, ethylhexanol, oleyl alcohol and, preferably, methanol and propanol.

Examples of polyalcohols of functionality greater than two which may be present are glycerol, trimethylolethane, trimethylolpropane, 1,2,4-butanetriol, pentaerythritol and the like.

The unsaturated polyesters can be manufactured by condensing the starting materials in the conventional ratios. Preferably, however, the ethylenically unsaturated dicarboxylic acids or dicarboxylic acid mixtures or their derivatives, especially anhydrides, with or without dicarboxylic acids free from olefinic unsaturation, and/or their anhydrides, and the diols or diol mixtures are polycondensed in such amounts that the ratio of total carboxyl groups to total hydroxyl groups is from about 1:1 to 1:1.1, preferably from 1:1 to 1:1.05.

It is possible to use, exclusively, ethylenically unsaturated dicarboxylic acids as the acid component for the manufacture of the unsaturated polyesters by the process according to the invention. If, however, mixtures of ethylenically unsaturated dicarboxylic acids and dicarboxylic acids free from olefinic unsaturation are used, the molar ratio can be varied within wide limits, for example from 100:1 to 1:10, preferably from 20:1 to 1:5, in accordance with the desired double bond content and with the reactivity associated therewith. Since the maximum crosslinkability of such polyesters is very important in some fields of use, for example in low-shrinkage systems, in determining the performance of the systems, the greater part, i.e. from 50 to 100%, of the dicarboxylic acid radicals present as condensed units in the polyesters should, in such cases, be ethylenically unsaturated.

To manufacture the unsaturated polyesters by the process according to the invention, the components for the synthesis of the polyester are polycondensed continuously in a stirred kettle cascade, which advantageously consists of from 2 to 5, preferably 3 or 4, stirred kettles connected in series, in the presence of a protective gas which is inert under the reaction conditions. Suitable stirred kettles are those conventionally used in the manufacture of unsaturated polyesters. Steam-heated stirred kettles are particularly advantageous; their heating temperature should in general be from 5° to 30° C., preferably from 5° to 15° C., above the effective temperature at which the melt condensation takes place in the particular case. The dimensions, and level of contents, of the individual stirred kettles connected in series can advantageously be selected so that the mean residence time in every kettle is the same, or about the same, and is advantageously from 1 to 7, preferably from 2 to 5, hours. The optimum level of contents in the kettles is in general from 70 to 80% of the volume of the kettles. However, this level can be varied within the range of from about 40% to 80% of the total volume by appropriate design of the overflow system from stirred kettle to stirred kettle, for example by interposing conveying devices, such as pumps.

Examples of suitable inert protective gases are nitrogen and carbon dioxide. Their oxygen content should advantageously be less than 0.01% by weight. The throughput of such an inert gas should advantageously be from 1 to 30, preferably from 2 to 20, 1/hour per stirred kettle per kilogram of reaction mixture in the kettle.

As has already been stated, the reaction temperature for the melt condensation is from 190° to 250° C., preferably from 195° to 220° C. It is essential to the invention that in the first reaction stage, which spatially corresponds to the first stirred kettle, the polycondensation should be carried out with the reaction mixture at the boil, which means that sufficient energy is supplied to the reaction mixture that the latter not only vaporizes at the surface but that gas bubbles are formed throughout the entire volume of the reaction mixture and that the volatile constituents are rapidly converted to vapor. According to a preferred embodiment, sufficient energy is supplied to the reaction mixture that from 10 to 100 grams, preferably from 15 to 50 grams, of vapor are formed per minute per 1,000 ml of reaction mixture.

The unsaturated polyester mixture formed in the first stage of the reaction is completely condensed in the second stage of the reaction, which spatially corresponds to the 2nd to 5th, preferably the 2nd to 3rd, stirred kettle, again at from 190° to 250° C., preferably from 190° to 210° C. The polycondensation temperature can be kept constant, or approximately constant, in all stirred kettles of the second reaction stage. However, in a preferred embodiment the polycondensation temperature is increased stepwise from the second to the last stirred kettle but even in this embodiment the condensation temperature can be the same in two or more stirred kettles. It has proved advantageous to maintain, in the second stirred kettle, a polycondensation temperature which is from 0° to 40° C., preferably from 5° to 30° C., above the boiling point of the first reaction stage, and to bring the temperature in the last stirred kettle to a value from 5° to 40° C., preferably from 10° to 30° C., above the boiling point in the first reaction stage, with intermediate temperatures—preferably about halfway between—in the intermediate stirred kettle or kettles.

The vapors from the first and second reaction stages, formed during the polycondensation, are fed to the vapor column, which consists of a two-part distillation column. This can be done by combining the vapors from the first and second reaction stages and feeding the combined vapors to the lower part of the two-part distillation column. Preferably, however, the vapors from the first and second stages of the reaction are passed through separate lines, with only the vapors from the individual stirred kettles of the second stage of the reaction being combined at this stage.

As already explained, the vapor column consists of a two-part distillation column which is filled with packings. Suitable packings are in the shape of, for example, spheres, rings, cylinders or tablets and consist, for example, of steel, preferably stainless steel, or ceramic materials. If spherical packings are used, the spheres in general have a diameter of from 2 to 8 mm. Cylindrical packings employed are in general cylinders which have a length of from 2 to 15 mm and a diameter of from 2 to 6 mm. Non-spherical or cylindrical packings usually have a volume which corresponds to that of the cylindrical packings.

The two-part distillation column has from 0.7 to 10, preferably from 1 to 5, theoretical plates in the upper part of the column and from about 0.5 to 3, preferably from 1 to 2, theoretical plates in the lower part of the column.

In the upper part of the two-part distillation column, which is at from about 95° to 135° C., preferably from 97° to 105° C., the mixture of diol and water of condensation is separated. For this purpose, the mixture is sprayed in counter-current with water of condensation, the spray density being from 0.5 to 5 m$^3$/m$^2$ per hour, preferably from 1.0 to 3 m$^3$/m$^2$ per hour. The water vapor which distils off, and in which the residual content of organic constituents, preferably diols, is less than 1.5 percent by weight, preferably from 1.2 to 0.8 percent by weight, based on the total weight, is then condensed by means of a condenser and divided, in a separator, into two part-streams in a weight ratio of from 15:1 to 1:1, preferably from 10:1 to 1:1. The part-stream containing the larger amount of water of condensation is recycled, introduced into the two-part distillation column at the top of the upper part and employed to spray the diol/water of condensation mixture. The other part-stream is run to waste.

In the lower part of the two-part distillation column, which is at from 110° to 180° C., preferably from 120° to 140° C., the unconverted dicarboxylic acids and/or their anhydrides, part of the diol, and any polycarboxylic acids, monoalcohols and/or polyalcohols which may have been employed for the polycondensation are absorbed, partially esterified and washed out by spraying in counter-current, with a spray density of from 20 to 80 m$^3$/m$^2$ per hour, preferably from 30 to 60 m$^3$/m$^2$ per hour, the wash solution used for spraying, and hence for washing out, being a mixture of diol which refluxes from the upper part of the two-part distillation column and may or may not contain water of condensation, together with freshly fed-in diol and reaction medium circulated through a heat exchanger. It has proved advantageous if the diol required for the polycondensation is introduced into the first reaction stage, in an amount of from 5 to 100%, preferably from 10 to 50%, based on the total amount, via the lower part of the two-part distillation column, the freshly fed-in diol being preferably introduced completely, or at least partially, into the circulating reaction medium before it flows through the heat exchanger. However, it is also possible to introduce the freshly fed-in diol into the reaction medium, at least partially, via the separate line in which the vapors from the second reaction stage are combined, and through which they pass.

The reaction medium which is obtained at the bottom of the two-part distillation column and which essentially consists of diols, dicarboxylic acids, dicarboxylic acid anhydrides, polycarboxylic acids, monoalcohols and/or polyalcohols which may have been used in the polycondensation, and the corresponding monoesters and diesters, with or without polyesters, of these starting components, as well as water, is, as already explained, partially circulated and used for spraying, and washing out, the lower part of the two-part distillation column. The other part of the medium is recycled to the first reaction stage. Advantageously, the ratio of the two part-streams is selected so that a part-stream of from 115 to 250 percent by weight, preferably from 130 to 160 percent by weight, based on the diol freshly fed into the two-part distillation column, is recycled to the first reaction stage as a reflux stream, whilst the remaining amount of the reaction medium is circulated. Using this procedure, the reaction medium is, on average, circulated from 5 to 50 times, preferably from 10 to 35 times, before it is drawn off into the first reaction stage.

A preferred embodiment of the process of manufacture according to the invention is described below in relation to the drawing.

In the drawing the symbols denote the following:
I Reaction vessel for the 1st reaction stage
II/IIa Reaction vessels for the 2nd reaction stage
III—Two-part distillation column (vapor column) filled with packings
IV Upper part of the two-part distillation column
V Lower part of the two-part distillation column VI Condenser
VII Separator
VIII Heat exchanger
IX Circulating pump for the reaction medium
X Circulating pump for the water of condensation
XI Metering pumps for the starting components
1. Feed line for diols, with or without monoalcohols and polyalcohols
2. Feed line for dicarboxylic acids and/or their derivatives, with or without polycarboxylic acids
3. Feed line for diols
4. Feed line for diols
5,5'. Outlet line for vapors from the first reaction stage
6. Outlet line for vapors from the individual reaction vessels of the second reaction stage
7. Collecting line for the combined vapors from the second reaction stage, or the first and second reaction stages
8. Reflux of reaction medium from the lower part of the two-part distillation column into the first reaction stage
9,9'. Outlet line for water of condensation (as vapor and/or liquid)
10. Effluent line into sewer
11. Feed line for water of condensation, for spraying the diol/water of condensation mixture
12. Circulating stream of reaction medium
13. Circulating stream of reaction medium enriched with freshly fed-in diol
14, 15. Outlet lines and feed lines, which may or may not be fitted with metering pumps, for the reaction mixture
16. Outlet line for the unsaturated polyester Feed lines and outlet lines for the inert gas have not been shown in the drawing, for the sake of clarity.

Diols, with or without monoalcohols and/or polyalcohols, and dicarboxylic acids and/or their derivatives, with or without polycarboxylic acids, are fed via the metering pumps XI, to the reaction vessel I of the first reaction stage through the lines 1 and 2. Reaction medium, coming as reflux from the lower part V of the two-part distillation column, is introduced into the same reaction vessel I through the feed line 8. The reaction mixture formed during the polycondensation is passed through the outlet line/feed line 14 from the reaction vessel I of the first reaction stage into the reaction vessel II of the second reaction stage, and from there through the outlet lines/feed lines 15 into the further reaction vessels IIa of the stirred kettle cascade. The unsaturated polyester is discharged through the outlet line 16.

The vapors formed during the polycondensation in the reaction vessel I of the first reaction stage are preferably fed directly, via the outlet line 5, to the lower part V of the two-part distillation column. The vapors formed in the second reaction stage in the reaction vessels II and IIa are passed through the outlet lines 6 into the collecting line 7 and from there—with or without combination, by means of line 5', with the vapors from reaction vessel I—are also passed to the lower part of the two-part distillation column. In order to spray, and wash out, the unconverted, or only partially converted, starting materials absorbed in the lower part V of the two-part distillation column, the reaction medium in lines 12 and 13 is circulated by means of the circulating pump IX, and through the heat exchanger VIII. Fresh diol is fed into the circulating stream, through the feed line 3, upstream from the heat exchanger VIII. Fresh diol can, if desired, also be fed into the reaction medium through feed line 4 via the vapor collecting line 7. This embodiment of the process is advantageously employed whenever the collecting line threatens to become blocked or has to be flushed out for any other reasons. In order to spray, and wash out, the unconverted or only partially converted starting materials adsorbed in the lower part V of the two-part distillation column not only the reaction medium containing fresh diol but also diol which refluxes from the upper part IV of the two-part distillation column and may or may not contain water of condensation is employed.

The upper part IV of the two-part distillation column serves to separate the diol/water of condensation mixture. For this purpose, the mixture is sprayed in counter-current with water of condensation, which may or may not still contain small amounts of diol, and which is fed to the top of the two-part distillation column III through the feed line 11 from the separator VII via the circulating pump X. The vapor of the water of condensation, which issues from the two-part distillation column and contains less than 1.5 percent by weight, based on total weight, of organic starting materials, is fed through the line 9' to the condenser VI and, after condensation, is passed through line 9 into the separator VII, where it may or may not be mixed with fresh water. The excess water of condensation is run to waste through outlet line 10.

The unsaturated polyester resins manufactured by the process of the invention have a color number of less than 40, whilst the unsaturated polyesters on which they are based preferably have a color number of from 20 to 100 (measured by the A.P.H.A. method, and expressed in Hazen units, see DIN 53,409), molecular weights of from 500 to 3,000, preferably from 800 to 1,500, acid numbers of from 20 to 80 and hydroxyl numbers of from 20 to 100, preferably from 30 to 80.

The unsaturated polyesters can be dissolved in the conventional manner in monomers, for example substituted or unsubstituted styrenes, e.g. styrene, tertiary butylstyrene, α-methylstyrene, vinyltoluene and divinylbenzene, acrylates and/or methacrylates, e.g. methyl methacrylate, butyl acrylate, tertiary butyl acrylate and ethylhexyl acrylate, and diallyl phthalate, and can be copolymerized with these monomers in the conventional manner. These solutions of polyesters in monomers, which contain from 20 to 50 percent by weight of monomer, based on total weight, may be used, for example, for the production of coatings, buttons, corrugated sheets, adhesives, containers and the like.

EXAMPLE 1

The apparatus consists of a stirred kettle cascade comprising 4 stirred kettles, connected in series and each having a capacity of 7,300 or 4,500 liters. The two-part distillation column III is packed with stainless steel Pall rings of size 25 mm and is so designed that the upper part IV of the distillation column has 2.6 theoretical plates and the lower part V has 1 theoretical plate. Commercial equipment is used for the heat exchanger VIII, condenser VI, separator VII, metering pumps and circulating pumps.

In the course of continuous operation, 610 kg/hour of propylene glycol are introduced through feed line 1, 568 kg/hour of maleic anhydride and 408 kg/hour of phthalic anhydride through feed line 2, and about 250 kg of reaction medium through the reflux 8, into the 1st stirred kettle, which corresponds to the first reaction stage. The reaction mixture is condensed, whilst boiling vigorously (at from 190° to 195° C.), and whilst introducing nitrogen at 15 m³/hour, until the acid number is about 125. For this purpose, the energy supplied to the stirred kettle per hour is about $2.9 \times 10^5$ kJoule. The residence time is about 5 hours.

The condensation of the resulting polycondensation mixture is completed in the 2nd, 3rd and 4th stirred kettles, which correspond to the second reaction stage, 60 m³/hour of nitrogen being passed through per stirred kettle. The condensation temperatures, residence times and acid numbers of the material produced are as follows: in the 2nd stirred kettle: 204° C., about 5 hours, 70 mg of KOH/g; in the 3rd stirred kettle: 206° C., about 5 hours, 49 mg of KOH/g; and in the 4th stirred kettle: 140° C., 2 hours and 47 mg of KOH/g. To stabilize the unsaturated polyester, 0.15 kg/hour of polymerization inhibitor are incorporated into the polycondensation mixture in the downstream mixing zone. Per hour, 1,540 kg of unsaturated polyester having a molecular weight of about 1,000 to about 1,200 and a color number of about 6 are obtained from the 4th stirred kettle. This corresponds to a yield of 99%.

For spraying, and washing out, the unconverted or only partially converted charge in the lower part V of the two-part distillation column, from 8 to 10 m³ of reaction medium per hour are circulated at from 120° to 130° C. through line 12 by means of the circulating pump IX. 100 kg per hour of fresh propylene glycol are introduced into the circulating stream through feed line 3. The reaction medium, containing fresh propylene glycol, is heated to 150° C. in the heat exchanger VIII. After mixing the reaction medium with the glycol refluxing from the upper part of the two-part distillation column, the spray density is 50 m³/m² per hour.

To separate the water of condensation in the upper part IV of the two-part distillation column, where the temperature continuously decreases in the upward direction and is from 105° to 97° C., 400 kg/hour of water at 25° C. are fed to the mixture through line 11. The spray density is 2.0 m³/m² per hour. 128 kg per hour of water are removed through the separator VII.

EXAMPLES 2 TO 5

The unsaturated polyesters are produced in the apparatus described in Example 1. The amounts of starting components fed in, the reaction parameters and the end products obtained are summarized in the Table which follows.

TABLE

| Example | | 2 | 3 | 4 | 5 |
|---|---|---|---|---|---|
| Introduction of starting materials through: | | | | | |
| Feed line 1 | kg/h | | | | |
| 1,2-propanediol | | 545 | 71 | 90 | 7 |
| ethylene glycol | | — | 440 | — | — |
| dipropylene glycol | | — | — | 398 | — |
| diglycol | | — | — | — | 212 |
| Feed line 2 | kg/h | | | | |
| maleic anhydride | | 257 | 304 | 119 | 175 |
| phthalic anhydride | | 773 | 888 | 180 | — |
| isophthalic acid | | — | — | — | 197 |
| adipic acid | | — | — | 355 | — |
| Feed line 3 | kg/h | 100 | 100 | 100 | 100 |
| 1st stirred kettle | | | | | |
| reflux of reaction medium 8: | kg/h | 240 | 260 | 270 | 230 |
| nitrogen feed | m³/h | 12 | 14 | 12 | — |
| energy supply | Joule/h | $2.7 \times 10^8$ | $3.1 \times 10^8$ | $2.5 \times 10^8$ | $1.5 \times 10^8$ |
| reaction temperature | °C. | 192 | 194 | 196 | 194 |
| residence time | h | 5 | 5 | 7.3 | 14 |
| acid number of the material discharged | mg KOH/g | 122 | 125 | 110 | 115 |
| 2nd stirred kettle | | | | | |
| nitrogen feed | m³/h | 50 | 60 | 55 | 40 |
| reaction temperature | °C. | 203 | 204 | 206 | 202 |
| residence time | h | 5 | 5 | 7.3 | 13 |
| acid number of the material discharged | mg KOH/g | 70 | 69 | 55 | 60 |
| 3rd stirred kettle | | | | | |
| nitrogen feed | m³/h | 50 | 60 | 55 | 40 |
| reaction temperature | °C. | 204 | 205 | 206 | 204 |
| residence time | h | 5 | 5 | 7.3 | 13 |
| acid number of the material discharged | mg KOH/g | 51 | 50 | 25 | 32 |
| 4th stirred kettle | | | | | |
| nitrogen feed | m³/h | 18 | 15 | 20 | 18 |
| reaction temperature | °C. | 140 | 130 | 100 | 135 |
| residence time | h | 2 | 2 | 3 | 5 |
| acid number of the material discharged | mg KOH/g | 48 | 47 | 22 | 30 |
| Lower part V of the two-part distillation column | | | | | |
| temperature range | °C. | 115–135 | 115–135 | 115–135 | 115–135 |
| amount of circulating reaction medium | m³/h | ~9 | ~9 | ~9 | ~9 |
| Feed temperature | ~°C. | 152 | 150 | 151 | 153 |
| Feed through line 3 | kg/h | 100 | 100 | 100 | 100 |
| 1,2-propanediol | | | | | |
| Spray density | m³/m² per h | 50 | 50 | 50 | 50 |
| Upper part IV of the two-part distillation column | | | | | |
| Water added through feed line 11 | kg/h | 370 | 420 | 400 | 410 |
| Water temperature | °C. | 25 | 23 | 20 | 23 |
| Temperature drop | °C. | 8 | 8 | 8 | 8 |
| Spray density | m³/m² per h | 1.85 | 2.1 | 2.0 | 2.05 |
| Amount of water discharged through separator VII | kg/h | 118 | 137 | 110 | 47 |
| yield of unsaturated polyester | kg/h | 1,541 | 1,645 | 1,120 | 632 |
| yield of unsaturated polyester | % | 99 | 98.5 | 99 | 99 |

TABLE-continued

| Example | 2 | 3 | 4 | 5 |
|---|---|---|---|---|
| acid number of unsaturated polyester | 48 | 47 | 22 | 30 |
| color number of unsaturated polyester | 60 | 40 | 40 | <100 |
| OH number of unsaturated polyester | <50 | <50 | <50 | <50 |
| molecular weight of unsaturated polyester | 1,100 | 1,200 | 1,600 | 2,000 |

We claim:

1. A process for the continuous manufacture of an unsaturated polyester by polycondensation of one or more ethylenically unsaturated dicarboxylic acids, with or without dicarboxylic acid(s) free from olefinic unsaturation, and/or their anhydrides, with one or more diols, with or without monohydric and/or higher polyhydric alcohol(s), in a stirred kettle cascade, wherein (a) in a first reaction stage, the dicarboxylic acid or acids and/or its anhydride or their anhydrides are condensed with the alcohol(s) in the molar ratio COOH or ½ (CO)$_2$O:OH of from 1:1.0 to 1:1.1, at from 190° to 250° C., with the proviso that the reaction mixture is boiling, the water of condensation is separated, from the vapors which distil off, by means of a vapor column, and the unconverted distilled-off or sublimed starting materials are recycled to the reaction mixture, the vapor column used being a two-part distillation column (i) in the upper part of which, at from 95° to 135° C., the diol/water of condensation mixture is separated by spraying it in counter-current with water of condensation, the spray density being from 0.5 to 5 m$^3$/m$^2$ per hour and (ii) in the lower part of the column, at from 110° to 180° C., unconverted dicarboxylic acid(s) and/or anhydride(s) and part of the alcohol are absorbed, partially esterified and washed out by spraying in counter-current, at a spray density of from 20 to 80 m$^3$/m$^2$ per hour, with a mixture of refluxing alcohol, freshly fed-in alcohol and circulated reaction medium, and are recycled to the reaction mixture, and (b) in a second stage of the reaction, the condensation of the resulting reaction mixture is completed at from 190° to 250° C.

2. A process as claimed in claim 1, wherein the condensation of the resulting reaction mixture is completed, in the second stage of the reaction, at from 190° to 250° C., the vapors from the individual stirred kettles of the stirred kettle cascade of this 2nd reaction stage being combined and conjointly fed to the vapor column.

3. A process as claimed in claim 1, wherein from 95 to 0 percent by weight of the alcohol are fed directly to the reaction mixture of the first stage of the reaction and from 5 to 100 percent by weight of the alcohol are fed, via the lower part of the two-part distillation column, to the reaction mixture, the percentages by weight being based on total weight.

4. A process as claimed in claim 1, wherein the reaction medium from the lower part of the two-part distillation column is divided and a part-stream of from 115 to 250 percent by weight, based on the alcohol freshly fed into the two-part distillation column, is recycled to the reaction mixture of the first stage of the reaction, whilst the other part-stream is circulated and thereby enriched with freshly fed-in alcohol.

5. A process as claimed in claim 1, wherein the reaction medium from the lower part of the two-part distillation column essentially consists of diols (with or without monohydric or higher polyhydric alcohols), dicarboxylic acids, dicarboxylic acid anhydrides, the monoesters and diesters of these dicarboxylic acids or dicarboxylic acid anhydrides and alcohols, and water.

6. A process as claimed in claim 1, wherein phthalic acid, isophthalic acid, terephthalic acid, adipic acid, succinic acid, glutaric acid and/or sebacic acid are used as the dicarboxylic acid which is free from olefinic unsaturation.

7. A process as claimed in claim 1, wherein maleic acid, fumaric acid, 1,2,3,6-tetrahydrophthalic acid, 3,6-endomethylene-1,2,3,6-tetrahydrophthalic acid, itaconic acid, citraconic acid and/or mesaconic acid are used as the ethylenically unsaturated dicarboxylic acid.

8. A process as claimed in claim 1, wherein the dicarboxylic acid component free from olefinic unsaturation and/or the dicarboxylic acid component containing ethylenic unsaturation are supplied in the form of the corresponding anhydride(s).

9. A process as claimed in claim 8, wherein phthalic anhydride, 1,2,3,6-tetrahydrophthalic anhydride, 3,6-endomethylene-1,2,3,6-tetrahydrophthalic anhydride and/or maleic anhydride is used as the carboxylic acid anhydride.

10. A process as claimed in claim 1, wherein ethylene glycol, 1,2- or 1,3-propylene glycol, 1,3-butanediol, 1,4-butanediol, neopentylglycol or 1,6-hexanediol is used as the diol.

* * * * *